US012670585B2

(12) United States Patent
Kornreich et al.

(10) Patent No.: US 12,670,585 B2
(45) Date of Patent: Jun. 30, 2026

(54) MIXED-FORMAT LABELS FOR PATHOLOGY DETECTION AND LOCALIZATION IN MAGNETIC RESONANCE (MR) IMAGING

(71) Applicant: Covera Health, New York, NY (US)

(72) Inventors: Micha Kornreich, New York, NY (US); JinHyeong Park, Princeton, NJ (US); Li Zhang, Princeton, NJ (US); James Browning, Glen Ridge, NJ (US); Jayashri Pawar, Mahwah, NJ (US); Benjamin Odry, West New York, NJ (US); Richard Herzog, New York, NY (US)

(73) Assignee: Covera Health, New York, NY (US)

( * ) Notice: Subject to any disclaimer, the term of this patent is extended or adjusted under 35 U.S.C. 154(b) by 362 days.

(21) Appl. No.: 18/116,364

(22) Filed: Mar. 2, 2023

(65) Prior Publication Data

US 2023/0281807 A1 Sep. 7, 2023

Related U.S. Application Data

(60) Provisional application No. 63/315,705, filed on Mar. 2, 2022.

(51) Int. Cl.
*G06V 10/774* (2022.01)
*G06T 7/00* (2017.01)
(Continued)

(52) U.S. Cl.
CPC .............. *G06T 7/0012* (2013.01); *G06T 7/11* (2017.01); *G06V 10/25* (2022.01); *G06V 10/267* (2022.01);
(Continued)

(58) Field of Classification Search
None
See application file for complete search history.

(56) References Cited

U.S. PATENT DOCUMENTS 6,269,176 B1 * 7/2001 Barski ....................... G06T 5/10
382/128
10,853,449 B1 * 12/2020 Nguyen ................. G06N 20/00
(Continued)

OTHER PUBLICATIONS

International Search Report and Written Opinion in related international application PCT/US2023/014312 issued on Jun. 1, 2023.
(Continued)

*Primary Examiner* — Tsung Yin Tsai
(74) *Attorney, Agent, or Firm* — Polsinelli PC

(57) ABSTRACT

Described are systems, techniques, and processes for pathology detection in radiological images. A process can include obtaining a radiological image corresponding to an imaged anatomical area. Based on processing the radiological image using a semantic segmentation neural network, a target map can be generated corresponding to a plurality of candidate anatomical defect locations within the cropped radiological image. At least one volume of interest (VOI) can be generated centered around a particular candidate anatomical defect location within the cropped radiological image. A classification neural network can be used to classify the particular candidate anatomical defect location within the cropped radiological image, wherein classifying the particular candidate anatomical defect location includes determining a pathology associated with the particular candidate anatomical defect location.

15 Claims, 4 Drawing Sheets

(51) Int. Cl.

| | |
|---|---|
| *G06T 7/11* | (2017.01) |
| *G06V 10/25* | (2022.01) |
| *G06V 10/26* | (2022.01) |
| *G06V 10/764* | (2022.01) |
| *G06V 10/82* | (2022.01) |

(52) U.S. Cl.
CPC .......... *G06V 10/764* (2022.01); *G06V 10/774* (2022.01); *G06V 10/82* (2022.01); *G06T 2207/10116* (2013.01); *G06T 2207/20081* (2013.01); *G06T 2207/20084* (2013.01); *G06T 2207/20132* (2013.01); *G06T 2207/30004* (2013.01); *G06V 2201/03* (2022.01)

(56)          References Cited

U.S. PATENT DOCUMENTS

| | | | | |
|---|---|---|---|---|
| 2013/0266197 A1* | 10/2013 | Nagenthiraja | ........ | G06T 7/0012 382/128 |
| 2017/0263023 A1* | 9/2017 | Zhou | ...................... | G06T 12/30 |
| 2018/0240233 A1* | 8/2018 | Kiraly | ................... | G06T 7/0012 |
| 2019/0172207 A1* | 6/2019 | Odry | ...................... | G06V 10/82 |
| 2020/0194117 A1* | 6/2020 | Krieger | ................ | A61B 5/0035 |
| 2020/0256856 A1* | 8/2020 | Chou | ...................... | B01L 3/508 |
| 2020/0265328 A1* | 8/2020 | Kaditz | ................... | G06N 5/046 |
| 2021/0096203 A1* | 4/2021 | Fernandez Villena | ....................... G01R 33/5608 |
| 2021/0118137 A1* | 4/2021 | Shi | ........................ | G06T 7/0014 |
| 2021/0169349 A1* | 6/2021 | Madabhushi | ........ | A61B 5/0035 |
| 2023/0252622 A1* | 8/2023 | Nielsen | ................. | G06T 7/0012 600/410 |
| 2023/0281807 A1* | 9/2023 | Kornreich | ........... | G06V 10/267 382/128 |

OTHER PUBLICATIONS

"Automatic Deep Learning-assisted Detection and Grading of Abnormalities in Knee MRI Studies", B. Asuto, et al., Radiology: Artificial Intelligence, vol. 3, No. 3, Apr. 2021.

Optimising Knee Injury Detection with Spatial Attention and Validating Localilsation Ability: N. Belton, et al., 16th European Conference—Computer Vision—ECCV 2020, Cornell University Library, pp. 71-86, Jul. 6, 2021.

"Interpretable and Lightweight 3-D Deep Learning Model for Automated ACL Diagnosis", Y, Jeon et al., IKEE Journal of Biomedical and Health Informatics, IEEE, Piscataway, NJ, vol. 25, No. 7, May 18, 2021.

* cited by examiner

MIXED-FORMAT LABELS FOR PATHOLOGY DETECTION AND LOCALIZATION IN MAGNETIC RESONANCE (MR) IMAGING

CROSS-REFERENCE TO RELATED APPLICATIONS

This application claims the benefit of priority to U.S. Provisional Patent Application No. 63/315,705, filed Mar. 2, 2022, and entitled "MIXED-FORMAT LABELS FOR PATHOLOGY DETECTION AND LOCALIZATION IN LARGE-SCALE STUDY OF KNEE MAGNETIC RESONANCE (MR) IMAGING," the disclosure of which is herein incorporated by reference in its entirety and for all purposes.

TECHNICAL FIELD

The present disclosure relates generally to automated pathology detection in medical imaging, and more specifically pertains to a multi-model pipeline for pathology detection machine learning using mixed-format training data.

BACKGROUND

Pathology detection and grading processes are often performed in the context of medical and/or diagnostic imaging. For example, a magnetic resonance (MR) image, or other medical image(s), can be reviewed for one or more pathologies that may be present. A severity grade can then be assigned to each detected pathology (e.g., a severity grade on a 1-3 scale, etc.). MR images may also be referred to as "radiological images," or "diagnostic images," among various other terms. In addition to MR images, radiological images can additionally, or alternatively, include X-ray images, computerized tomography (CT) images, positron emission tomography (PET) images, etc.

Machine learning-based approaches can be used to perform various pathology detection processes. For example, one or more machine learning networks can be trained using training data that includes, or is otherwise associated with, MR images and/or other radiological images. Labeled training data can be generated based on labeling (e.g., annotating) the images included in the training data set. For instance, each radiological image included in a labeled set of radiological training data images can include ones or more types of annotation information, wherein the content of the annotated information corresponds to each particular radiological image. For instance, annotation information for radiological images can include, but is not limited to, a severity grade, a pathology identification, a pathology classification, a pathology location, etc. Based at least in part on the different combinations or types of annotation information that can be used to generate labeled training data for a particular MR or other radiological image, multiple different forms and formats of labeled training data can exist. Moreover, in some cases, various other labeling schemes and/or conventions may also be used, each having their own corresponding type(s) of annotation information.

SUMMARY

In some examples, systems and techniques are described for automated pathology detection in medical imaging, such as magnetic resonance (MR) medical images. For example, a multi-model and multi-stage machine learning architecture can be trained, using mixed-format training data, to perform anatomical landmark detection and pathology classification tasks. In some aspects, the anatomical landmark detection and/or pathology classification tasks can be trained corresponding to one or more specific anatomical landmarks and/or one or more specific pathologies. In some examples, the anatomical landmark detection and/or pathology classification tasks can be trained to generalize for a plurality of specific anatomical landmarks and/or a plurality of specific pathologies. In one illustrative example, the systems and techniques described herein can augment a categorically-labeled training dataset of radiological images with positional information, during training of one or more machine learning networks for the anatomical landmark detection and pathology classification tasks. For instance, categorical-labels indicative of text information or category information associated with a pathology present in a radiological training data image can be augmented with one or more positional labels indicative of position information corresponding to the categorically-labeled pathologies. In some aspects, the positional label information can comprise positional defect labels (e.g., positional point-like defect landmark labels). In some examples, the positional label information can comprise point landmarks, bounding boxes (e.g., defect bounding boxes or defect bounding box labels), etc.

According to at least one illustrative example, a method is provided, the method including: obtaining a radiological image, the radiological image corresponding to an imaged anatomical area; generating, based on processing the radiological image using a semantic segmentation neural network, a target map corresponding to a plurality of candidate anatomical defect locations within the cropped radiological image; generating at least one volume of interest (VOI) centered around a particular candidate anatomical defect location within the cropped radiological image; and classifying, using a classification neural network, the particular candidate anatomical defect location within the cropped radiological image, wherein classifying the particular candidate anatomical defect location includes determining a pathology associated with the particular candidate anatomical defect location.

In another example, an apparatus is provided that includes a memory (e.g., configured to store data, such as virtual content data, one or more images, etc.) and one or more processors (e.g., implemented in circuitry) coupled to the memory. The one or more processors are configured to and can: obtain a radiological image, the radiological image corresponding to an imaged anatomical area; generate, based on processing the radiological image using a semantic segmentation neural network, a target map corresponding to a plurality of candidate anatomical defect locations within the cropped radiological image; generate at least one volume of interest (VOI) centered around a particular candidate anatomical defect location within the cropped radiological image; and classify, using a classification neural network, the particular candidate anatomical defect location within the cropped radiological image, wherein classifying the particular candidate anatomical defect location includes determining a pathology associated with the particular candidate anatomical defect location.

In another example, a non-transitory computer-readable medium is provided that has stored thereon instructions that, when executed by one or more processors, cause the one or more processors to: obtain a radiological image, the radiological image corresponding to an imaged anatomical area; generate, based on processing the radiological image using a semantic segmentation neural network, a target map corresponding to a plurality of candidate anatomical defect locations within the cropped radiological image; generate at least one volume of interest (VOI) centered around a particular candidate anatomical defect location within the cropped radiological image; and classify, using a classification neural network, the particular candidate anatomical defect location within the cropped radiological image, wherein classifying the particular candidate anatomical defect location includes determining a pathology associated with the particular candidate anatomical defect location.

In another example, an apparatus is provided, the apparatus including: means for obtaining a radiological image, the radiological image corresponding to an imaged anatomical area; means for generating, based on processing the radiological image using a semantic segmentation neural network, a target map corresponding to a plurality of candidate anatomical defect locations within the cropped radiological image; means for generating at least one volume of interest (VOI) centered around a particular candidate anatomical defect location within the cropped radiological image; and means for classifying, using a classification neural network, the particular candidate anatomical defect location within the cropped radiological image, wherein classifying the particular candidate anatomical defect location includes determining a pathology associated with the particular candidate anatomical defect location.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. The use of a same reference numbers in different drawings indicates similar or identical items or features. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
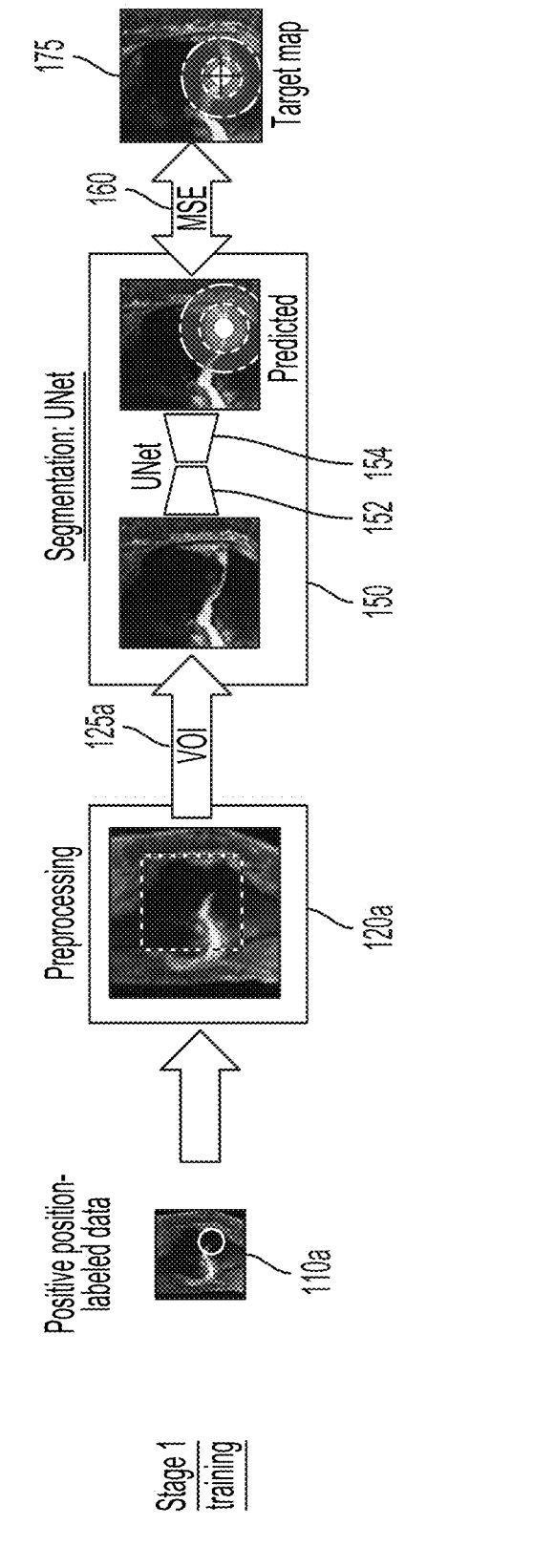
FIG. 1A illustrates an example machine learning architecture first stage that can be trained to perform anatomical landmark detection using a target map, in accordance with some examples.

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure. Additional features and advantages of the disclosure will be set forth in the description which follows, and in part will be obvious from the description, or can be learned by practice of the herein disclosed principles. It will be appreciated that for simplicity and clarity of illustration, where appropriate, reference numerals have been repeated among the different figures to indicate corresponding or analogous elements. The description is not to be considered as limiting the scope of the embodiments described herein.

Overview

Labeling (also referred to as annotation) of radiological images for pathology detection can be a laborious task, and is often performed by highly trained and costly experts (e.g., medical or radiological professionals). Moreover, various labeled datasets that can be used for pathology detection often have mixed formats, due at least in part to the multiple different combinations and types of labeling information that can be used, as well as variations in preference or style across different expert reviewers tasked with labeling a dataset of medical images.

For example, the mixed formats that can be seen in labeled datasets can include, but are not limited to, a mix of pathology positional labels and categorical labels. Combining different datasets, especially datasets using different labeling formats, can be challenging and impractical. However, it would be desirable to successfully and efficiently combine mixed-format data from multiple experts across multiple organizations or institutions, as such mixed-format datasets can be important for improving model training and evaluation (and model generalization). As such, there is a need for efficient techniques that incorporate different labeling formats in training one or more machine learning models (e.g., machine learning networks) for tasks such as pathology detection, classification, and/or grading.

In one approach to training a machine learning network (also referred to herein as a machine learning model) using mixed-format labeled training data, the mixed-format labeled training data can be reduced to single-format labeled training data and training can proceed conventionally. For example, consider a mixed-format labeled dataset that includes a positional-annotation dataset (e.g., medical images annotated with point-landmark defect labels) and a categorial-annotation dataset (e.g., medical images annotated with a categorical label selected from a fix set of possible labels, such as a set of pathologies or a set of severity grades). In a simplified approach, the positional-annotation dataset can be reduced to match the form of the categorical-annotation dataset, thereby yielding a single-format labeled dataset comprising only categorical annotations. However, reducing the positional annotation labels to categorical annotation labels may be seen to discard additional information that could be used to improve the training and/or inference process(es) of a pathology detection machine learning network.

In another approach to training a machine learning network using mixed format labeled training data, a model can be designed which can combine the mixed formats in training. For example, an instance learning model can be constructed to combine bounding boxes with categorical labels. However, incorporating point-landmark defect labels with categorical labels and combining mixed-format data for pathology detection tasks in training has not been investigated or achieved. Additionally, existing approaches to mixed-format labels for training a pathology detection machine learning network have not been seen to provide high-resolution prediction of defect locations, which would be desirable for improved accuracy and quality of subsequent medical care rendered.

Accordingly, described herein are systems and techniques for utilizing mixed-format labels in generating training data for training one or more pathology detection and/or localization machine learning networks. For instance, in one illustrative example, the systems and techniques can be used to provide a machine-learning framework that augments a categorical dataset of radiological images with one or more types of positional information. As will be described in greater depth below, the positional information can correspond to various portions and/or features of a particular radiological image, can correspond to a categorical label of the categorical dataset, or various combinations of the two.

The generalizable two-stage approach described herein can be seen to direct machine learning model attention to regions of input radiological images (e.g., anatomical regions represented in the input radiological images) where pathologies of interest are more likely to occur, or are otherwise highly likely to occur. The model attention can be directed based on exploiting all of the mixed-format training data available during training of the machine learning model (e.g., the mixed-format training data comprising radiological images associated with categorical label information and positional label information).

In some aspects, a UNet machine learning network can be combined with a morphological peak-finding algorithm to provide defect localization within radiological images utilized as input by the presently disclosed systems and techniques. In one illustrative example, average accuracies associated with the peak-finding-based defect localization within radiological images may be seen to be within the range of 4.3-5.1 millimeters (mm).

In the context of the following discussion, reference is made to an example in which the one or more machine learning networks are trained to perform pathology detection and localization in knee magnetic resonance (MR) imaging (e.g., knee MRI). However, it is appreciated that the example of knee MR imaging is selected for purposes of illustration and clarity of explanation, and is not intended to be construed as limiting—aspects of the present disclosure can be applied or otherwise utilized in the context of one or more additional machine learning pathology-related tasks and/or in the context of one or more additional pathology types, pathology locations, anatomical regions, radiological imaging types, combinations of mixed-format labels or annotations, etc., without departing from the scope of the present disclosure.

Example Training Process with Mixed Format Labels

In one illustrative example, the systems and techniques described herein can be used to train one or more machine learning networks to perform pathology detection tasks using mixed format labeled training data. For example, the mixed format labeled training data can include positional defect data (e.g., radiological images annotated with point-landmark defect labels) and available structured (e.g., categorical) reports associated with radiological images. The positional defect data and the categorical defect data may correspond to the same set(s) of radiological images (e.g., the radiological images may each be associated with one or more positional defect labels and one or more categorical defect labels). In some examples, the positional defect data and the categorical defect data can, at least in part, correspond to different sets of radiological images (e.g., a first subset of radiological images may each be associated with one or more positional defect labels only, a second subset of radiological images may each be associated with one or more categorical defect labels only, and/or a third subset of radiological images may each be associated with both positional defect labels and categorical defect labels).

A key challenge in the clinical deployment of artificial intelligence and machine learning models in medical imaging (e.g., radiological imaging) is the failure of existing models to generalize across institutions, demographics, and imaging protocols. Accordingly, it is important to train and evaluate models over a broad variety of data sources, and to be able to combine these sources efficiently in training. However, different data sources which focus on the same pathology detection task could include different label data types, as well as different image types. For example, this is especially true in knee Mill studies, where Mill orientations, protocols, and scanners can significantly differ between unassociated institutions. In addition, some data sources (e.g., sources of radiological images) include positional labels such as point-landmarks or bounding boxes, while others only include categorical labels in the form of text or categories.

As contemplated herein, combining positional and categorical defect labels can improve network attention and performance over purely categorical training (e.g., as in existing and/or conventional approaches). Previous implementations of attention focusing have been based on using anatomical landmarks only (i.e., that do not label a defect). Accordingly, there is a need for systems and techniques that can be used to provide pathology detection machine learning models combining different defect label types. Described herein is a two stage machine learning model to combine positional point-like defect landmark labels with categorical defect labels.

The first stage of the machine learning model can be trained on positional labels to predict possible defect locations in radiological images. A compact volume-of-interest (VOI) is cropped around each predicted defect location, to thereby improve network attention (e.g., to improve network attention on downstream tasks, operations, etc., that make use of input(s) based on the cropped/compact VOI within the radiological image).

The second stage of the machine learning model can be used to classify the pathologies present in each of the VOIs. In one illustrative example, the second stage classification can be implemented using a convolutional network (e.g., a convolutional neural network (CNN)), and may be trained on a combination of positional labels and categorical labels. This two-stage technique overcomes the difficulties faced by conventional object and/or point detection models while training on class imbalanced sets—a common scenario in the medical field. The systems and techniques described herein are evaluated on four knee MRI defect detection and localization tasks, including anterior cruciate ligament (ACL) integrity and injury age, as well as medial compartment cartilage (MCC) high-grade defect and subchondral osteoarthritis related edema underlying the cartilage defect. The classification performance was comparable to the inter-reader agreement levels in the human radiologists' reviews, and superior to a purely categorical machine-learning baseline approach.

In some embodiments, the one or more pathology detection machine learning networks can be trained on the mixed format labeled training data in a multi-stage process, as will be described in greater depth below. Advantages of the disclosure include the ability to efficiently combine categorical-label datasets with positional-label datasets during training and the ability to train and infer on studies (e.g., radiological images and/or radiological imaging data) that include one, or multiple, series.

Example Dataset and Ground Truth Labeling Process

In one illustrative example, an example dataset associated with the presently disclosed systems and techniques for machine-learning-based pathology localization and classification using mixed-format labels during training can be provided as described below. For instance, the example dataset includes 5,676 ACL reviews collected from 5,082 imaging studies, and 4,759 MCC reviews, collected from 4,251 studies. Studies were split between training (66%), validation (21%) and test sets (13%). The split was performed in two stages. First, random sampling was performed at a 70-30-10% ratio. Subsequently, positive cases (e.g., pathology and/or defect present) were randomly sampled from the training set, until each positive category in the test set included at least 100 cases. The data did not include multiple studies for any single patient. Studies were collected at over 25 different institutions, and differed in scanner manufacturers, magnetic field strengths, and imaging protocols. The most common series types included fat-suppressed (FS) sagittal (Sag), coronal (Cor) and axial (Ax) orientations, using either T2-weighted (T2) or proton-density (PD) protocols, as summarized below in Table 1. For pathology detection, either SagFS, SagPD, or both were used.

TABLE 1

Series availability for studies. Sag FS, Cor FS and Sag Non-FS used for model training and inference.

| Series Type | T2 | PD | Either |
|---|---|---|---|
| Sag FS | 46% | 59% | 96% |
| Cor FS | 26% | 76% | 92% |
| Axial FS | 18% | 74% | 90% |
| Sag Non-FS | 19% | 77% | 92% |

Described below is an example ground truth labeling process that can be used to generate some, or all, of the mixed-label training data described herein. Each study (e.g., set of one or more radiological images) of the example dataset was reviewed by at least one of eight board-certified radiologists with an MSK fellowship. The review was performed using either a structured form (for categorical labels) or a custom viewer. Radiologists using the viewer also annotated the position of the defect. In both formats, the same ACL and MCC defect categories were used, as presented in Tables 2 and 3, below:

TABLE 2

Summary of series annotated with defects. SagPD series not used in training or inference.

| Defect | SagFS | CorFS | SagPD |
|---|---|---|---|
| ACL C. Tear | 288 | 777 | 162 |
| ACL Acute | 192 | 702 | 83 |
| MCC Edema | 438 | 392 | 74 |
| MCC Grade | 1094 | 1032 | 548 |

TABLE 3

Defect descriptions used in the radiologists' labelling guidelines.

| | Defect name | Definition in radiologists' guidelines |
|---|---|---|
| ACL | Complete Tear | Complete tear (or avulsion) |
| ACL | Acute Injury | Acute or subacute partial or complete tear (<6 month injury) |
| MCC | Grade | Medial Compartment defect extending through more than 50% of the cartilage thickness |
| MCC | Edema | More than trace osteoarthritis-associated edema underlying high-grade cartilage defect |

ACL categories included ACL defect (normal, degeneration, partial tear, or complete tear) and ACL injury age (non-acute, or acute). For the MCC, structured report categories included Cartilage defects (normal or slight thinning, small high-grade defect, moderate high-grade defect, or large high-grade defect) and Edema underlying cartilage defects (none or trace edema, or more than trace edema). The edema labeled in the example dataset differs from the one labeled in previous studies, as the example dataset and edema labeling is limited to non-traumatic, osteoarthritis associated edema that is underlying a high-grade defect. This distinction can be clinically important, because osteoarthritis associated edema is often a good predictor of structural deterioration in knee osteoarthritis. Notably, an annotated review could include the same location label type (e.g., a small high-grade defect) multiple times in the same series, one for each such observed defect on the cartilage surface.

Described below are examples of labels used by the presently disclosed machine learning model(s), including the two-stage machine learning model for pathology localization and classification.

In one illustrative example, model training and evaluation can be performed based on grouping label categories to create four tasks that can assist in surgical decision making. For ACL defects, a first machine learning model can be trained to differentiate Complete tear defects from Not-complete tear defects. A second machine learning model can be trained to predict Acute vs. Non-acute defect states. With respect to MCC defects, a third machine learning model can be trained to perform a differentiation task to differentiate High-grade defects from Not-high-grade defects. A fourth machine learning model can be trained to predict Underlying edema vs. None or trace edema defect states.

Example categorical- and position-labeled data for different pathologies are described below in Tables 4 and 5:

TABLE 4

Available categorical- and position-labeled
data for different pathologies

| Labels | Class | ACL C. Tear | ACL Acute | MCC Edema | MCC Grade |
|---|---|---|---|---|---|
| Categorical | 0 | 2323 | 2161 | 1327 | 1122 |
| | 1 | 147 | 80 | 198 | 403 |
| Positional | 0 | 1794 | 1907 | 2260 | 1808 |
| | 1 | 818 | 705 | 466 | 918 |
| Total | | 5082 | 4853 | 4251 | 4251 |

TABLE 5

Categorical and position-annotated data for different pathologies.
(219 ACL reports were missing injury age information).

| Labels | Class | ACL C. Tear | | | ACL Acute | | | MCC Edema | | | MCC Grade | | |
|---|---|---|---|---|---|---|---|---|---|---|---|---|---|
| | | All | Val | Test | All | Val | Test | All | Val | Test | All | Val | Test |
| Categorical | 0 | 2323 | 471 | 235 | 2161 | 455 | 222 | 1327 | 274 | 140 | 1122 | 228 | 123 |
| | 1 | 147 | 30 | 15 | 80 | 11 | 10 | 198 | 39 | 20 | 403 | 85 | 37 |
| Positional | 0 | 1794 | 365 | 334 | 1907 | 382 | 350 | 2260 | 463 | 398 | 1808 | 383 | 328 |
| | 1 | 818 | 179 | 142 | 705 | 162 | 126 | 466 | 104 | 91 | 918 | 184 | 161 |
| Total | | 5082 | 1045 | 726 | 4853 | 1010 | 708 | 4251 | 880 | 469 | 4251 | 880 | 469 |

Inter-reader agreement analysis was conducted on 1,398 studies with multiple reviews. For training and testing, if two conflicting reviews for the same study existed, the position-annotated review was preferred over the categorical-only review.

Stage I. Landmark Training

FIG. 1A is a diagram illustrating an example machine learning architecture 100a that can be trained to perform anatomical landmark detection based on a target map, in accordance with some examples. In some embodiments, the example machine learning architecture 100a can be associated with a first stage of the two-stage machine learning network described herein. For instance, the example machine learning architecture 100a of FIG. 1A can be trained in a first training stage (and the example machine learning architecture 100b of FIG. 1B can be trained in a second training stage, described in greater depth below).

As illustrated, during stage 1 training, the example machine learning architecture 100a can receive as input positive position-labeled data 110a. The positive position-labeled data 110a can comprise a plurality of radiological images that each include at least one defect and/or pathology of interest (e.g., and therefore are "positive" training data examples). The positive position-labeled data 110a can include at least one position-label corresponding to each defect or pathology of interest represented within a particular positive position-labeled data 110a.

In one illustrative example, the positive position-labeled data 110a can be provided as input to a pre-processing stage 120a. In some embodiments, the pre-processing stage 120a can implement one or more pre-processing operations using deep reinforcement learning (DRL). For instance, radiological images provided as input to the pre-processing stage 120a (e.g., such as the positive position-labeled data 110a) can be automatically cropped around an anatomical area of interest, prior to pathology detection. For example, the pre-processing stage 120a can be used to automatically crop the positive position-labeled data 110a around an anatomical area of interest, such as the ACL or MCC.

In some embodiments, pre-processing stage 120a can perform cropping around an anatomical area of interest based on detecting one or more anatomical landmarks corresponding to a particular anatomical area of interest. For example, when the anatomical areas of interest are the ACL or MCC, two anatomical landmarks, the Intercondylar Eminence and the Fibular Styloid, can be detected using a deep reinforcement learning machine learning model included within or otherwise implemented by the pre-processing stage 120a.

A volume-of-interest (VOI) can be generated, positioned with respect to the location of the landmarks. For example, the pre-processing stage 120a can generate a cropped (e.g., compact) VOI 125a centered on or around the detected location of an anatomical landmark corresponding to the anatomical area of interest. For instance, the cropped VOI 125a can correspond to the dashed line square overlaid on the radiological image depicted in pre-processing stage 120a of FIG. 1A.

In some aspects, the dimensions of VOI 125a can be determined such that the VOI 125a includes (e.g., completely includes) the anatomy of interest (e.g., ACL or MCC). The ACL VOI can be a 75×75×75 mm³ cube, centered 2.5 mm anteriorly and 2.5 mm medially from the Intercondylar Eminence. The MCC VOI dimensions can be 80 mm (superior-inferior), 95 mm (Anterior-posterior) and 75 mm (left-right). The MCC VOI can be located 27.5 mm superior, 12.5 mm anterior, and 12.5 mm medial to the Intercondylar Eminence. In some examples, cropped medical images can be linearly interpolated in-plane to a 0.325 mm resolution. Medical images with out-of-plane resolution below 2 mm can be sub-sampled (but not interpolated out-of-plane) to approximately a 4 mm resolution. In some embodiments, pre-processing stage 120a may additionally perform intensity-standardization for an input radiological image (e.g., positive position-labeled data 110a) by clipping the $1^{st}$ and $99^{th}$ percentile intensities, followed by volume normalization to 0 mean intensity and 1 standard deviation.

In one illustrative example, the stage 1 training associated with example machine learning architecture 100a of FIG. 1A can be utilized to train landmark detection and/or localization of potential defects within an input radiological image (e.g., such as the positive position-labeled data 110a).

For instance, a semantic segmentation neural network 150 can be used to locate potential defects. As used herein, the terms "potential defect location(s)" and "candidate anatomical defect location(s)" may be used interchangeably. In some embodiments, the semantic segmentation neural network 150 can implemented as a Residual UNet model including an encoder-decoder architecture (e.g., corresponding to the encoder 152 and decoder 154 depicted in FIG. 1A). For example, the Residual UNet model can be the same as or similar to that described in Ronneberger, O., Fischer, P., Brox, T.: *U-net: Convolutional networks for biomedical image segmentation.* International Conference on Medical image computing and Computer-Assisted Intervention.

The Residual UNet model 150 can be trained to perform landmark detection (e.g., landmark training) wherein each volume can have none, one, or many target landmarks. In some embodiments, this first stage of landmark training can use training data that includes only the pathology-positive studies from the mixed format labeled training dataset, and only series (e.g., volumes) of the underlying radiological images of the mixed format labeled training dataset with at least one positional annotation. For example, the positive position-labeled data 110*a* can comprise (or be obtained as) a portion of the mixed format labeled training dataset that includes only the pathology-positive annotated training data.

In the Stage I landmark training process (e.g., the landmark detection training process associated with FIG. 1A), a target map 175 can be created for each volume included in the pathology-positive annotated training data. In some embodiments, the target map 175 can be created for each volume wherein each label in location $\mu$ is replaced by an isotropic Gaussian sphere as follows:

$$I_G = \frac{1}{\sigma\sqrt{2\pi}} e^{-\|x-\mu\|^2/2\sigma^2} \qquad \text{Eq. (1)}$$

where $I_G$ is the isotropic Gaussian sphere and $\sigma=10$ mm. In some examples, the segmentation neural network 150 (e.g., Residual UNet) can be trained based on a mean square error (MSE) loss function 160, which minimizes the loss (i.e., mean square error) between a ground-truth target map 175 and a corresponding predicted map of candidate anatomical defect locations generated as output by the decoder 154 of the segmentation UNet 150.

In the context of the present disclosure, the Stage I training of the UNet segmentation neural network 150 can be performed using a mean square error (MSE) loss function 160, as noted above, and the ADAM optimizer (lr=0.0001), with a 128×128×24 volume size and a batch size of ten. However, it is appreciated that one or more different training parameters can also be utilized without departing from the scope of the present disclosure. In some examples, a separate UNet (e.g., the same as or similar to the UNet neural network 150 of FIG. 1A) can be independently trained for each of the four tasks that are represented in Table 4, above.

For example, in some embodiments the presently disclosed pathology detection machine learning networks (also referred to as a multi-model pipeline or multi-model pathology detection machine learning) can be trained to perform pathology detection tasks on mixed format labeled training data of MR images of the knee, wherein the pathology detection tasks include: anterior cruciate ligament (ACL) Tear; ACL Acute; medial condylar center (MCC) Edema; and MCC Grade.

Figure 1B:
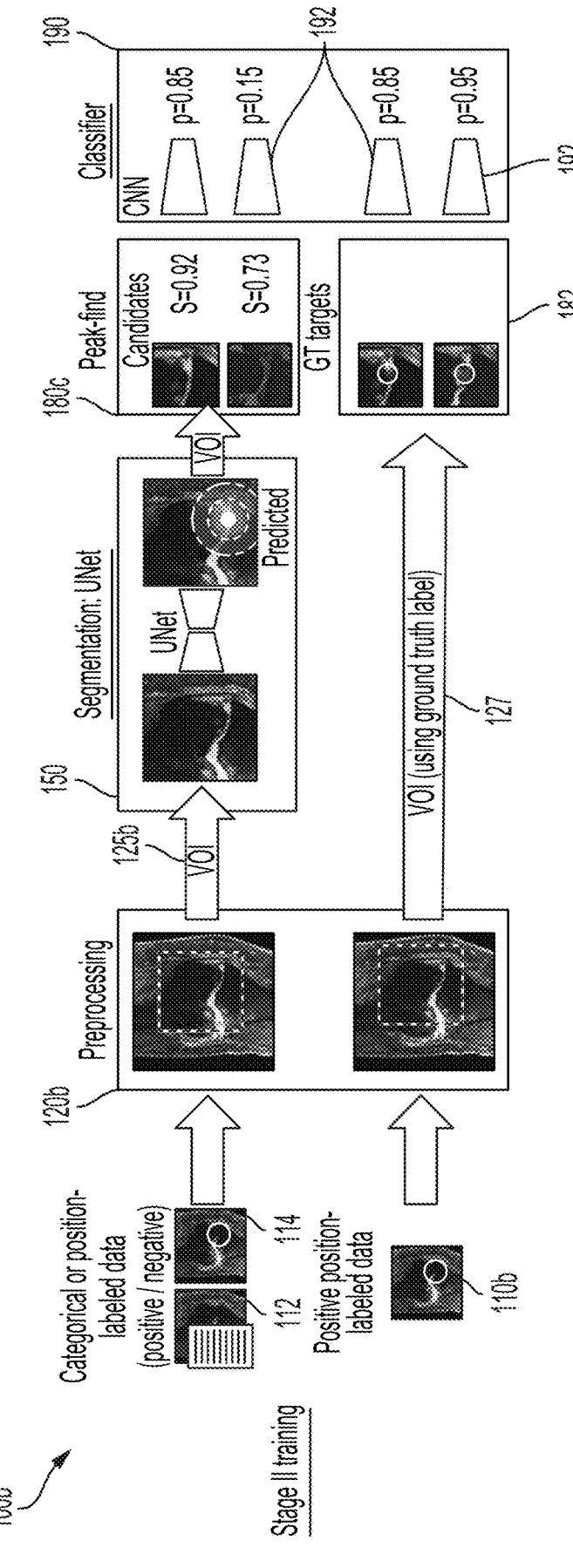
FIG. 1B illustrates an example machine learning architecture second stage that can be trained to perform pathology detection and/or classification using peak-finding, in accordance with some examples.

In some embodiments, coordinates of potential defect landmarks (e.g., candidate anatomical defect locations) can be extracted from the output of UNet neural network 150 and provided to or otherwise utilized in the Stage II architecture 100*b* depicted in FIG. 1B. In one illustrative example, a fast peak-finding algorithm 180*c* can be utilized to select the best defect candidate from the UNet output volume. For example, a convoluted map can be created using a Gaussian Kernel with $\sigma=10$ mm (e.g., isotropic in world-coordinates). Then, the grayscale dilation of the volume can be subtracted from the convoluted map. In some embodiments, pixels with a 0 value in the subtracted volume and over $\frac{1}{5}$ in the convoluted map can be considered candidate defects.

In some cases, all candidate defects from the Stage I landmark detection training described above with respect to FIG. 1A can be forwarded to the Stage II classification training that will be described below with respect to FIG. 1B. In some embodiments, during test and validation of the pathology detection machine learning network(s) disclosed herein, only the defect candidate with the highest value in the convoluted map may be selected for forwarding to the Stage II classification. It is additionally noted that, in instances in which the Stage I landmark detection finds no defect candidates, the full model prediction can be negative (e.g., class 0 or severity grade 0).

Stage II: Classification Training

In some embodiments, a second machine learning stage can be trained and utilized to perform classification of a particular candidate anatomical defect location with a cropped radiological image or VOI (e.g., the VOI 125*a*/125*b* depicted in FIGS. 1A and 1B, respectively). For example, the second machine learning stage can be implemented based on the example machine learning architecture second stage 100*b* depicted in FIG. 1B. The second stage machine learning architecture 100*b* can be trained to perform pathology detection and/or other classification tasks using peak-finding, in accordance with some examples. For instance, as noted above, the second stage architecture 100*b* can be trained and utilized to perform pathology classification over the landmark detection defect candidate(s) (e.g., candidate anatomical defect location(s)) generated as output by the Stage I landmark detection described above with respect to the segmentation UNet neural network 150.

In some embodiments, the Stage II classification can utilize or include one or more classification machine learning networks 190. In one illustrative example, the classifier 190 can be implemented using a convolutional architecture (e.g., using one or more CNNs). For example, the Stage II classification can utilize a classifier 190 that is implemented as a 3D ResNet50 machine learning network with an Adam optimizer (lr=0.0001).

In one illustrative example, for each task (e.g., each of the four tasks described above with respect to Table 4), the 3D ResNet50 classifier 190 (or other machine learning model) can be trained and evaluated on 40×40×40 mm³ cubic volumes generated by cropping around the candidate defect locations (e.g., within the underlying medical images of the mixed format labeled training dataset) predicted at the output of the Stage I landmark detection machine learning model(s). In particular, the classifier 190 can be trained and evaluated on the VOIs generated as output by the UNet segmentation network 150 for each input radiological image of the training or evaluation data set.

Each cube (e.g., VOI) can be generated around a single candidate anatomical defect location that was predicted in stage I, or a location provided by ground-truth annotations. For instance, as depicted in FIG. 1B, categorical or position-labeled data 112 and 114, respectively, can be provided to pre-processing stage 120*b*, which generates as output the VOI 125*b* provided as input to segmentation UNet neural network 150. In some aspects, the categorical or position-labeled data 112, 114 can be positive/negative data. Based on receiving the cropped VOI 125b, the segmentation UNet neural network 150 can generate as output a plurality of candidate anatomical defect locations within the cropped VOI 125b (e.g., and therefore, within the corresponding radiological image 112 or 114 from which the VOI 125b was cropped from/is included within). The plurality of candidate anatomical defect locations predicted by the segmentation UNet neural network 150 can be provided as input to the peak-finding algorithm 180c, which analyzes each candidate anatomical defect location corresponding to the VOI and identifies the best candidate anatomical defect location (e.g., wherein the best candidate anatomical defect location is associated with a greatest peak value, as determined by the peak-finding algorithm 180c).

Ground-truth references can be generated based on providing positive position-labeled data 110b as an additional, but separate, input to the preprocessing stage 120b. In some embodiments, the positive position-labeled data 110b of FIG. 1B can be the same as the positive position-labeled data 110a of FIG. 1A and/or the pre-processing stage 120b of FIG. 1B can be the same as the pre-processing stage 120a of FIG. 1A.

The preprocessing stage 120b can generate as output a ground truth VOI 127, which is generated using a ground-truth label associated with the radiological image included in the positive position-labeled data input 110b. The ground truth VOI does not need to be provided to the segmentation UNet neural network 150 in the Stage II training context of FIG. 1B, but is instead utilized to determine one or more ground-truth targets 182 (e.g., depicted in FIG. 1B as "GT targets"). The ground truth targets 182 can be provided as input to the classifier 190 and used to train the classification of pathologies present in the VOI inputs corresponding to the categorical or position-labeled data inputs utilized by the segmentation UNet neural network 150 and/or peak-finding algorithm 180c.

In some aspects, limiting the classifier 190 to the compact VOIs described above can improve network attention and subsequent performance. In some embodiments, the series (e.g., volumes) of the medical images of the mixed format labeled training dataset for which the Stage I landmark detection found no defect candidates can be excluded from the Stage II classification training. As contemplated herein, the training data provided to the Stage II classification machine learning model(s) can include the locations provided by the ground-truth annotations of the overall mixed format labeled training dataset.

Training of the classifier 190 can be performed based on a cross-entropy loss or loss function on each series (e.g., each radiological image series) included in the training dataset input from which the radiological training data images 112, 114 (and/or 110b) were obtained. In some cases, during training, the categorical ground truth for the study (rather than the series) is used. For example, as depicted in FIG. 1, the 'Stage II training' can be performed using training data inputs including the structured and annotated data contained in the overall mixed format labeled training dataset and can further include positive structured training data (e.g., the locations provided by the ground-truth annotations). In some embodiments, as compared to the 'Stage I training,' the 'Stage II training' can additionally receive structured data and can additionally receive all annotated data (e.g., rather than only positive annotated data, as with the 'Stage I training'). In some embodiments, the positive annotated data provided to the 'Stage I training' can be the same as the positive structured data provided to the 'Stage II training.' In some embodiments, the positive annotated data provided to the 'Stage I training' can be different than the positive structured data provided to the 'Stage II training.' In one illustrative example, the Stage II classification machine learning model(s) can be trained using cross-entropy loss on each series, where the categorical ground truth locations (e.g., provided by the positive structure data received as a training data input to Stage II) for the case (rather than the series) is utilized.

Performance

Figure 1C:
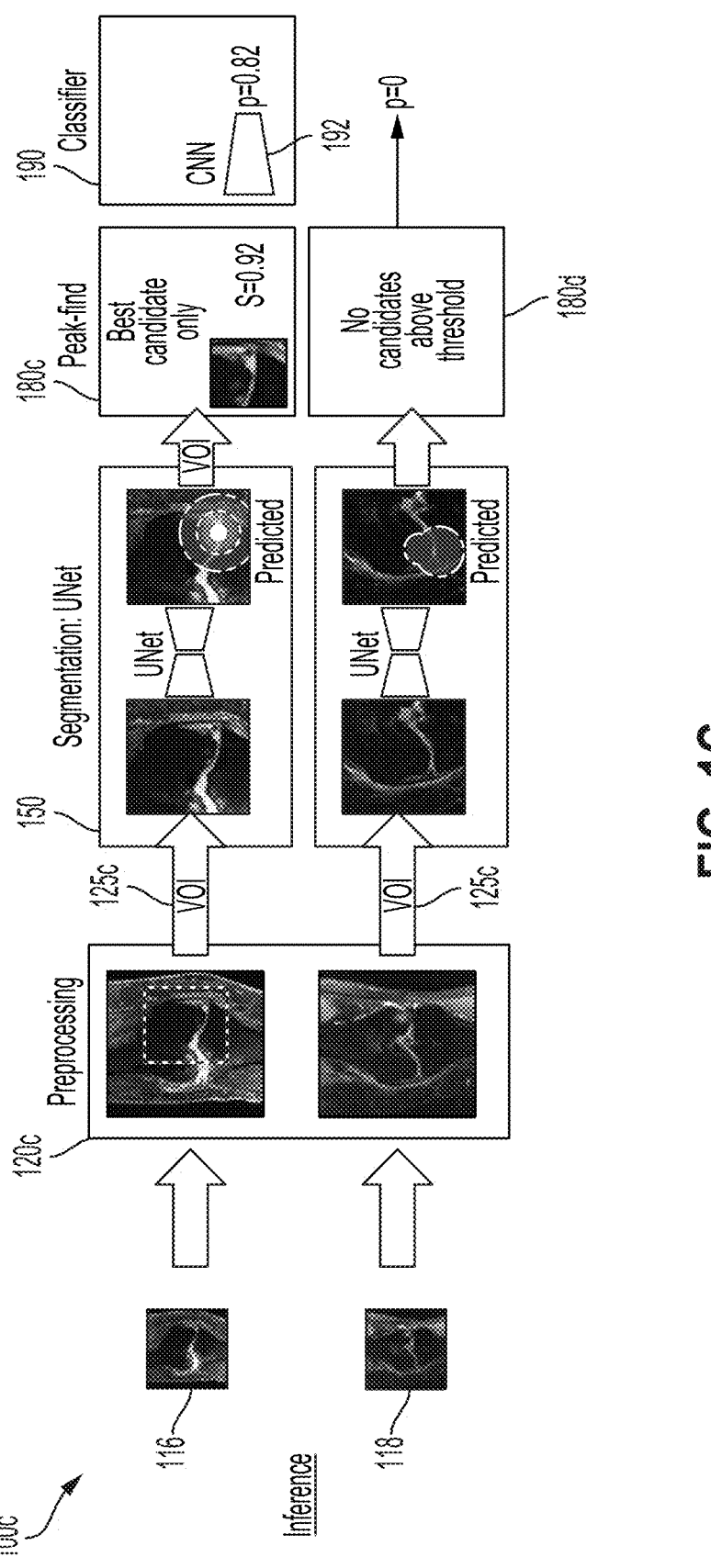
FIG. 1C illustrates an example machine learning architecture that can be used during inference to perform anatomical landmark detection and pathology classification, in accordance with some examples.

To accurately assess the expected performance of the full multi-model pathology detection machine learning pipeline disclosed herein on unlabeled data during testing, only locations predicted in Stage I were used, as depicted in the example machine learning architecture 100c of FIG. 1C. For instance, during inference, the trained machine learning architecture 100c can receive as input one or more un-labeled radiological images (series or study), such as the unlabeled radiological images 116, 118. In some aspects, preprocessing stage 120c depicted in FIG. 1C can be the same as or similar to the preprocessing stage 120a of FIG. 1A and/or the preprocessing stage 120b of FIG. 1B. Similarly, the VOIs 125c can be generated in a manner the same as or similar to that described above with respect to the VOIs 125a and 125b of FIGS. 1A and 1B, respectively. The segmentation UNet neural network 150 can be the same as that described above with respect to the Stage I architecture 100a and the Stage II architecture 100b. During inference, the peak-finding algorithm 180c can be configured to iden-tify the best candidate anatomical defect location and pro-vide as input to the classifier 190 only the best candidate anatomical defect location (e.g., as opposed to the Stage II training, described above with respect to FIG. 1B, in which multiple or all of the candidate anatomical defect locations can be provided as input to the classifier 190 for purposes of training). As depicted in FIG. 1C, if peak-finding algorithm 180 determines that no candidate anatomical defect loca-tions identified by the segmentation UNet neural network 150 are greater than a threshold, then an input is not provided to the classifier 190 (e.g., p=0 and no defect is classified or detected), as shown with respect to 180d.

To establish and demonstrate the effectiveness of the systems and techniques described herein, performance was analyzed against several baselines and also validated against a public dataset.

Baseline

The baseline convolutional model was evaluated on two datasets. A first dataset included only structured data in categorical format. A second dataset was a categorical dataset which included both a structured-only format and a combined structured+annotated format.

For example, Table 6 (below) presents ablation study sensitivity options. The first dataset, including only struc-tured data in categorical format, corresponds to entries in which the 'Report' column='Struct' and the 'Method' column='ResNet'. The second dataset, which was a cat-egorical dataset including both structured-only formats and combined structured+annotated formats, corresponds to entries in which the 'Report' column='Both' and the 'Method' column='ResNef'. The latter dataset was created by reducing the positional-annotated data into categorical format (e.g., taking the most severe label for each annotated case and removing the location information).

TABLE 6

| | | | ACL Tear | | | ACL Acute | | | MCC Edema | | | MCC Grade | | |
|---|---|---|---|---|---|---|---|---|---|---|---|---|---|---|
| Report | Method | P. | Sp. | Sn. | AUC | Sp. | Sn. | AUC | Sp. | Sn. | AUC | Sp. | Sn. | AUC |
| Struct. | ResNet | | 0.83 | 0.43 | 0.72 | 0.65 | 0.79 | 0.77 | 0.74 | 0.63 | 0.74 | 0.65 | 0.78 | 0.80 |
| Annot. | Lmk. | | 0.93 | 0.67 | 0.91 | 0.90 | 0.71 | 0.85 | 0.90 | 0.69 | 0.86 | 0.93 | 0.76 | 0.91 |
| Annot. | Lmk. | + | 0.91 | 0.91 | 0.95 | 0.94 | 0.73 | 0.88 | 0.95 | 0.75 | 0.89 | 0.90 | 0.80 | 0.92 |
| Both | ResNet | | 0.90 | 0.91 | 0.96 | 0.96 | 0.63 | 0.87 | 0.83 | 0.81 | 0.88 | 0.88 | 0.78 | 0.91 |
| Both | Lmk. | | 0.92 | 0.75 | 0.92 | 0.90 | 0.74 | 0.86 | 0.91 | 0.69 | 0.87 | 0.84 | 0.86 | 0.91 |
| Both | Lmk. | + | 0.92 | 0.93 | 0.97 | 0.92 | 0.78 | 0.89 | 0.93 | 0.78 | 0.90 | 0.90 | 0.88 | 0.94 |
| Inter-reader | | | 0.97 | 0.84 | | 0.97 | 0.74 | | 0.92 | 0.69 | | 0.87 | 0.84 | |

Caption: Example ablation study sensitivity option. Top results are given in bold.

The convolutional baseline model which utilized both datasets performed well in the two ACL tasks (e.g., ACL Tear and ACL Acute) where most positive cases belonged to the annotated dataset. However, on most tasks it can be seen that the convolutional baseline model does not perform as well as the combined approach disclosed herein, e.g., where the presently disclosed multi-model pathology detection machine learning pipeline trained on mixed format labeled training data corresponds to 'Method'='Link.' in Table 6, above.

Another example set of performance information corresponding to the disclosed two-stage machine learning architecture trained on mixed-format labels is presented below in Table 7, which summaries an ablation study of different training methods and datasets where each model was run 5 times using randomly initialized weights to produce an average plus or minus a standard deviation. At Stage I training, for landmark detection, the training can be implemented to achieve high sensitivity, because false positive studies will be filtered by Stage II. In three example evaluation tasks, a sensitivity exceeding 95% was observed for the trained two-stage machine learning architecture described herein. By training on positive samples only at Stage I (e.g., corresponding to FIG. 1A) and using Stage II (e.g., corresponding to FIG. 1B) for filtering, the systems and techniques can avoid difficulties otherwise encountered when training object detection models on mostly negative samples. The localization accuracy of Stage I confirms that the defects are captured by the 40×40×40 mm³ VOI cube provided as input to the following Stage II.

Proposed Multi Model Pathology Detection Machine Learning Pipeline—Results

Stage II inference results were obtained by using cropped volumes, which were centered around the best defect candidates (e.g., landmark locations) predicted by Stage I. Stage II sensitivity, specificity and AUC are detailed in Table 6, above, under the table entries corresponding to the Landmark (Lmk.) method (e.g., the table entries with 'Method'='Lmk.').

For ablation research, four different models were trained. Two models only used annotated data in training. The other two models used both structured and annotated data, facilitated by the multi-stage combined approach disclosed herein. In addition, for two of the four models, a random perturbation shift was added to the best candidate location, sampled uniformly in the range [−3.5, 3.5] mm in each direction (denoted under the column 'P.' in Table 6, above). Evaluation was performed on the same data set for all four models.

Described above are systems and techniques for a pathology detection machine learning architecture that can be used to flexibly combine categorical labels of radiological images with positional labels of radiological images during training. The applicability and improvements provided by the present disclosure are demonstrated above in four knee MRI pathology detection tasks, for purposes of illustration and example. The systems and techniques described herein leverage available positional-annotated data of radiological images to attach location information (e.g., position information) to categorical labels of the radiological images, which

TABLE 7

| Labels method perturb | | Categ ResNet | Positional two-stage | Positional two-stage + | Both ResNet | Both two-stage | Both two-stage + | Inter-reader |
|---|---|---|---|---|---|---|---|---|
| ACL | Sp. | 82.8 ± 1.3 | 92.4 ± 0.8 | 90.2 ± 0.7 | 89.4 ± 0.8 | 92.2 ± 0.4 | 92.2 ± 0.7 | 97 |
| C. Tear | Sn. | 47.8 ± 5.8 | 65.4 ± 1.9 | 89.4 ± 1.0 | 91.0 ± 0.6 | 76.4 ± 1.2 | 92.6 ± 0.5 | 84 |
| | AUC | 72.0 ± 0.6 | 90.8 ± 0.4 | 94.8 ± 0.4 | 95.8 ± 0.3 | 91.8 ± 0.4 | 97.0 ± 0.2 | |
| ACL | Sp. | 65.8 ± 1.7 | 89.8 ± 0.7 | 93.4 ± 1.0 | 94.0 ± 1.4 | 89.8 ± 1.0 | 92.2 ± 0.7 | 97 |
| acute | Sn. | 74.8 ± 3.0 | 69.8 ± 1.5 | 73.0 ± 1.4 | 64.0 ± 0.9 | 72.4 ± 1.0 | 78.4 ± 1.0 | 74 |
| MCC | AUC | 75.6 ± 1.6 | 84.4 ± 0.5 | 87.6 ± 0.5 | 88.0 ± 0.6 | 85.8 ± 0.4 | 89.2 ± 0.4 | |
| edema | Sp. | 73.6 ± 2.4 | 89.2 ± 0.7 | 94.0 ± 0.9 | 82.8 ± 1.2 | 90.8 ± 0.7 | 92.8 ± 0.7 | 92 |
| | Sn. | 64.4 ± 2.7 | 68.3 ± 0.8 | 74.2 ± 0.7 | 80.8 ± 0.4 | 70.2 ± 0.7 | 78.4 ± 0.5 | 69 |
| MCC | AUC | 74.2 ± 1.2 | 86.4 ± 0.5 | 88.4 ± 0.5 | 87.4 ± 0.5 | 87.0 ± 0.9 | 90.2 ± 0.4 | |
| grade | Sp. | 66.2 ± 1.5 | 92.4 ± 0.8 | 89.8 ± 0.7 | 87.6 ± 1.0 | 83.2 ± 1.2 | 89.0 ± 0.6 | 87 |
| | Sn. | 77.8 ± 1.6 | 75.2 ± 0.7 | 80.4 ± 1.0 | 77.7 ± 0.5 | 85.4 ± 0.5 | 88.2 ± 0.4 | 84 |
| | AUC | 79.6 ± 1.4 | 90.4 ± 0.5 | 91.6 ± 0.5 | 90.4 ± 0.5 | 91.0 ± 0.6 | 93.8 ± 0.4 | |

Caption: Example ablation study of different training methods and datasets, where each model was run 5 times using randomly initialized weights to produce average ± std. Inter-reader sensitivity and specificity are presented in the last row.

improves the overall model performance. In addition, the systems and techniques can be seen to reliably localize anatomical defects, which can enable further uses in computer-aided diagnosis and/or AI-based quality assurance. Notably, and advantageously, without any re-training, the presently disclosed machine learning model, which was trained to use either one or two MM orientations, can generalize well to different publicly available datasets, for instance which may include one orientation (Sag) only. Further, the systems and techniques described herein can be employed in other computer vision domains, such as captioning, where similar mixed-format label types are often available during training.

Figure 2:
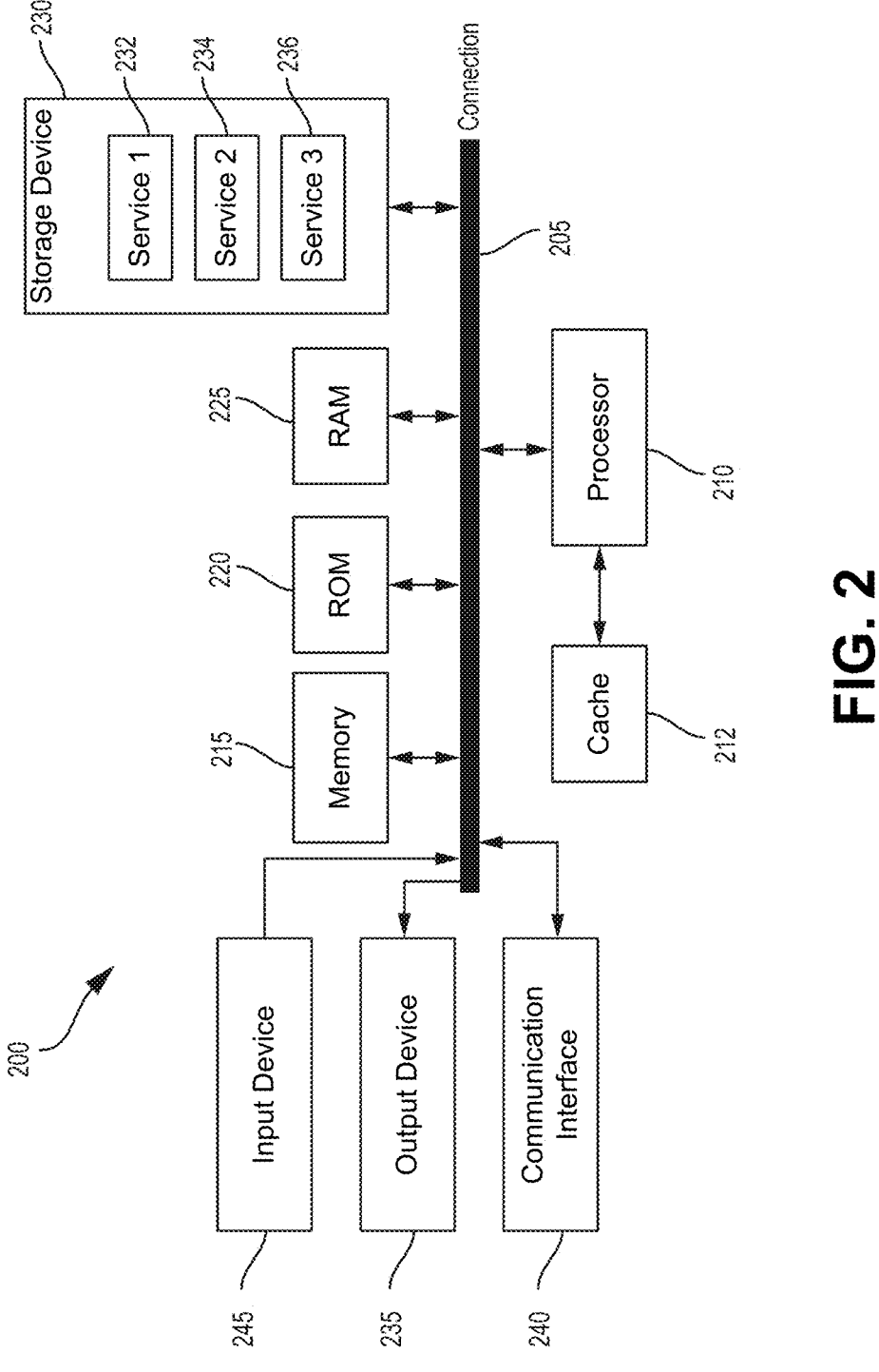
FIG. 2 illustrates an example computing system that can be used to implement various aspects described herein.

FIG. 2 illustrates an example computing device architecture 200 of an example computing device which can implement the various techniques described herein. The components of computing device architecture 200 are shown in electrical communication with each other using connection 205, such as a bus. The example computing device architecture 200 includes a processing unit (CPU or processor) 210 and computing device connection 205 that couples various computing device components including computing device memory 215, such as read only memory (ROM) 220 and random access memory (RAM) 225, to processor 210.

Computing device architecture 200 can include a cache of high-speed memory connected directly with, in close proximity to, or integrated as part of processor 210. Computing device architecture 200 can copy data from memory 215 and/or the storage device 230 to cache 212 for quick access by processor 210. In this way, the cache can provide a performance boost that avoids processor 210 delays while waiting for data. These and other modules can control or be configured to control processor 210 to perform various actions. Other computing device memory 215 may be available for use as well. Memory 215 can include multiple different types of memory with different performance characteristics. Processor 210 can include any general purpose processor and a hardware or software service, such as service 1 232, service 2 234, and service 3 236 stored in storage device 230, configured to control processor 210 as well as a special-purpose processor where software instructions are incorporated into the processor design. Processor 210 may be a self-contained system, containing multiple cores or processors, a bus, memory controller, cache, etc. A multi-core processor may be symmetric or asymmetric.

To enable user interaction with the computing device architecture 200, input device 245 can represent any number of input mechanisms, such as a microphone for speech, a touch-sensitive screen for gesture or graphical input, keyboard, mouse, motion input, speech and so forth. Output device 235 can also be one or more of a number of output mechanisms known to those of skill in the art, such as a display, projector, television, speaker device, etc. In some instances, multimodal computing devices can enable a user to provide multiple types of input to communicate with computing device architecture 200. Communication interface 240 can generally govern and manage the user input and computing device output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof. Storage device 230 can include services 232, 234, 236 for controlling processor 210. Other hardware or software modules are contemplated. Storage device 230 can be connected to the computing device connection 205. In one aspect, a hardware module that performs a particular function can include the software component stored in a computer-readable medium in connection with the necessary hardware components, such as processor 210, connection 205, output device 235, and so forth, to carry out the function.

The term "device" is not limited to one or a specific number of physical objects (such as one smartphone, one controller, one processing system, and so on). As used herein, a device can include any electronic device with one or more parts that may implement at least some portions of this disclosure. While the description and examples use the term "device" to describe various aspects of this disclosure, the term "device" is not limited to a specific configuration, type, or number of objects. Additionally, the term "system" is not limited to multiple components or specific examples. For example, a system may be implemented on one or more printed circuit boards or other substrates, and may have movable or static components. While the description and examples use the term "system" to describe various aspects of this disclosure, the term "system" is not limited to a specific configuration, type, or number of objects.

Specific details are provided in the description to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the examples.

Individual aspects and/or examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects of the present disclosure can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method comprising:
obtaining a radiological image, the radiological image corresponding to an imaged anatomical area;
generating a target map corresponding to a plurality of candidate anatomical defect locations within a cropped radiological image comprising a subset of the radiological image, wherein the target map comprises predicted positional information generated as a prediction output of a semantic segmentation neural network trained based on positional defect data comprising a first label format included in a set of mixed-format labels associated with a plurality of training radiological images;
generating, using a Gaussian kernel of a morphological peak-finding algorithm, a convoluted map including a respective peak for each candidate anatomical defect location of the target map, wherein generating the convoluted map includes convolving the target map with the Gaussian kernel to obtain the respective peak for each candidate anatomical defect location;
identifying, using the morphological peak-finding algorithm and the convoluted map, a particular candidate anatomical defect location from the plurality of candidate anatomical defect locations, wherein the identifying includes selecting, from the convoluted map, a location associated with a greatest peak value in the convoluted map;
generating at least one volume of interest (VOI) centered around the particular candidate anatomical defect location within the cropped radiological image; and
classifying, using a classification neural network trained based on both the positional defect data and categorical defect data comprising a second label format included in the set of mixed-format labels associated with the plurality of training radiological images, the particular candidate anatomical defect location within the cropped radiological image, wherein:
the classification neural network is further trained on a set of VOIs including one or more VOIs each centered around a defect location predicted by the semantic segmentation neural network based on the positional defect data, and one or more VOIs each centered around a ground-truth defect location included in the set of mixed-format labels;
classifying the particular candidate anatomical defect location includes determining categorical information corresponding to a predicted pathology associated with the particular candidate anatomical defect location; and
the categorical information is indicative of a predicted defect type of the predicted pathology and a predicted severity grade for the predicted defect type.

2. The method of claim 1, wherein the classification neural network comprises a three-dimensional (3D) ResNet50 convolutional neural network (CNN).

3. The method of claim 1, wherein:
the classification neural network is trained using the plurality of training radiological images; and
each respective training radiological image of the plurality of training radiological images is associated with a categorical label comprising the second label format and indicative of an anatomical defect category present in the respective training radiological image.

4. The method of claim 3, wherein:
the plurality of training radiological images are associated with categorical labels comprising the second label format and positional labels comprising the first label format of the set of mixed-format labels.

5. The method of claim 1, wherein the at least one VOI is generated centered around a candidate anatomical defect coordinate determined based on the target map.

6. The method of claim 1, further comprising:
analyzing, using the morphological peak-finding algorithm, each candidate anatomical defect location of the plurality of candidate anatomical defect locations;
identifying, using the morphological peak-finding algorithm, the particular candidate anatomical defect location as a best candidate from the plurality of candidate anatomical defect locations based on having the greatest peak value; and
generating the VOI centered at the predicted positional information predicted by the semantic segmentation neural network for the particular candidate anatomical defect location identified by the morphological peak-finding algorithm as the best candidate.

7. The method of claim 6, wherein the classification neural network receives a corresponding VOI centered around each candidate anatomical defect location of the plurality of candidate anatomical defect locations during training.

8. The method of claim 1, wherein the semantic segmentation neural network comprises a Residual UNet neural network.

9. The method of claim 1, wherein:

the target map is indicative of the plurality of candidate anatomical defect locations; and each candidate anatomical defect location of the plurality of candidate anatomical defect locations is associated with an isotropic Gaussian sphere.

10. The method of claim 1, wherein:

the semantic segmentation neural network is trained using the plurality of training radiological images, wherein each respective training radiological image of the plurality of radiological images is associated with a positional label indicative of a position of an anatomical defect within the respective training radiological image.

11. The method of claim 10, wherein the positional label comprises one or more of a point-landmark or a bounding box associated with the position of the anatomical defect within the respective training radiological image.

12. The method of claim 1, further comprising:

generating a cropped radiological image based on cropping the radiological image around an anatomical area of interest; and generating the target map based on processing the cropped radiological image using the semantic segmentation neural network.

13. The method of claim 12, wherein cropping the radiological image around the anatomical area of interest comprises:

automatically generating a cropped volume of interest (VOI) centered around the anatomical area of interest, the anatomical area of interest identified in the radiological image using a deep reinforcement learning (DRL) machine learning network.

14. The method of claim 13, wherein the cropped VOI includes all of the anatomical area of interest.

15. The method of claim 12, wherein the anatomical area of interest comprises an anterior cruciate ligament (ACL) or a medial compartment cartilage (MCC) represented in the radiological image.

\* \* \* \* \*